(12) United States Patent
Nishiyama et al.

(10) Patent No.: US 9,710,897 B2
(45) Date of Patent: Jul. 18, 2017

(54) IMAGE PROCESSING APPARATUS, IMAGE PROCESSING METHOD, AND RECORDING MEDIUM

(71) Applicant: CANON KABUSHIKI KAISHA, Tokyo (JP)

(72) Inventors: Tomohiro Nishiyama, Tama (JP); Chiaki Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/064,352

(22) Filed: Mar. 8, 2016

(65) Prior Publication Data

US 2016/0269628 A1    Sep. 15, 2016

(30) Foreign Application Priority Data

Mar. 10, 2015   (JP) .................................. 2015-047631

(51) Int. Cl.
*H04N 5/225* (2006.01)
*G06T 5/20* (2006.01)
*H04N 5/232* (2006.01)
*G06T 7/13* (2017.01)

(52) U.S. Cl.
CPC .................. *G06T 5/20* (2013.01); *G06T 7/13* (2017.01); *H04N 5/2258* (2013.01); *H04N 5/23229* (2013.01)

(58) Field of Classification Search
None
See application file for complete search history.

(56) References Cited

FOREIGN PATENT DOCUMENTS

JP    4341019 B2    10/2009

*Primary Examiner* — Roberto Velez
*Assistant Examiner* — Stephen Coleman
(74) *Attorney, Agent, or Firm* — Canon U.S.A., Inc. IP Division

(57) ABSTRACT

At a time of compositing images each of which has a different angle of view, the images are composited by deciding weights of composition for each of the images based on an edge of an image of an object and using the decided weights. At this time, in a periphery of the edge of the image of the object, a weight of an image having a large angle of view is set to be small.

18 Claims, 13 Drawing Sheets

IMAGE PROCESSING APPARATUS, IMAGE PROCESSING METHOD, AND RECORDING MEDIUM

BACKGROUND OF THE INVENTION

Field of the Invention

The present disclosure generally relates to image processing and, more particularly, to an image processing apparatus, an image processing method, a recording medium, and to processing of compositing images each of which has a different angle of view.

Description of the Related Art

As a method of performing noise reduction of images, a technique of compositing a plurality of images which are obtained by capturing the same scene has been known. Moreover, as an image capturing apparatus which captures a plurality of images simultaneously, there is an image capturing apparatus which includes a plurality of image capturing units each of which has a different angle of view (Japanese Patent No. 4341019). In Japanese Patent No. 4341019, described is that, when performing virtual zoom processing (electronic zooming) by enlargement of an image, the electronic zooming is performed by switching, according to a virtual angle of view, an image obtained by wide-angle imaging and an image obtained by telephotography.

In the case of enhancing an effect of noise reduction to the maximum level by image composition, all of a plurality of images which are captured can be combined. However, in a case where the plurality of images which are captured include images, each of which has a different angle of view, as the technique described in Japanese Patent No. 4341019, there is a problem that, when all of the images are composited as they are, an image with relatively high resolution, which is obtained from a telephotographed image, is degraded due to the composition. Then, the disclosure suppresses degradation in resolution in the case of performing noise reduction by compositing images each of which has a different angle of view.

SUMMARY OF THE INVENTION

An image processing apparatus according to the disclosure includes: an acquiring unit configured to acquire a first image which is captured by a first image capturing unit having a first angle of view and a second image which is captured by a second image capturing unit having a second angle of view smaller than the first angle of view, the second image including an image of an object same as that in the first image; a transforming unit configured to perform positioning and transformation of the first image and the second image such that images of the same object are superposed; a detecting unit configured to perform processing of edge detection for detecting an edge of each of the images of the object in a region in which the first image and the second image are superposed; a deciding unit configured to decide weights at a time of applying weighted composition to the first image and the second image which are subjected to the positioning and the transformation by the transforming unit; and a composition unit configured to apply the weighted composition to the first image and the second image which are subjected to the positioning and the transformation by the transforming unit, by using the weights decided by the deciding unit, in which the deciding unit decides the weights such that a weight of the first image with respect to the second image in a partial region including a region, which is detected as the edge by the detecting unit, is smaller than a weight of the first image with respect to the second image in a region other than the partial region.

Further features of the present disclosure will become apparent from the following description of exemplary embodiments with reference to the attached drawings.

DESCRIPTION OF THE EMBODIMENTS

Embodiments of the disclosure will be described in detail below with reference to drawings. Note that, the embodiments below are merely exemplifications, and there is no intention to limit the scope of the disclosure.

Exemplary Embodiment 1

In the present exemplary embodiment, description will be given for an image capturing apparatus which performs processing of electronic zooming that, based on two pieces of captured image data, each of which has a different angle of view, and a virtual angle of view designated by a user, virtual-angle-of-view image data corresponding to the virtual angle of view is generated. At this time, virtual-angle-of-view image data of wide-angle photography, which has a small zoom factor, is obtained by increasing the virtual angle of view, and virtual-angle-of-view image data of telephotography, which has a great zoom factor, is obtained by reducing the virtual angle of view. That is, the user is able to change the zoom factor of the virtual-angle-of-view image data by changing the virtual angle of view. The processing described in the present exemplary embodiment is usable for processing of generating preview image data at a time of image capturing or processing of generating image data with a certain zoom factor after image capturing.

Figure 1:
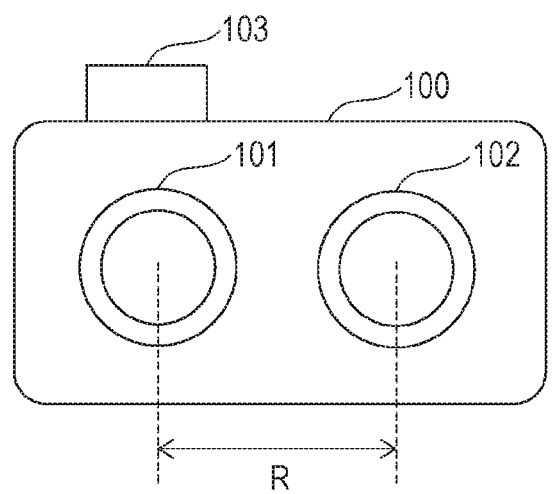
FIG. 1 is a view illustrating one example of an image capturing apparatus of a multi-camera type, which includes a plurality of image capturing units, according to an exemplary embodiment 1.

FIG. 1 is a view illustrating one example of a configuration of an image capturing apparatus according to the present exemplary embodiment. As illustrated in FIG. 1, an image capturing apparatus 100 includes two image capturing units 101 and 102, which acquire color image data, and an image capturing button 103. The image capturing unit 101 and the image capturing unit 102 are arranged so that respective optical axes thereof are parallel. In the present exemplary embodiment, it is set that an interval between the image capturing unit 101 and the image capturing unit 102 in a horizontal direction is R, an angle of view of the image capturing unit 101 is $\theta_1$, and an angle of view of the image capturing unit 102 is $\theta_2$. Note that, it is set that $\theta_1 > \theta_2$, and the image capturing unit 101 has an angle of view greater than that of the image capturing unit 102. When the user presses the image capturing button 103, each of the image capturing units 101 and 102 receives optical information of an object with a sensor (image capturing element), received signals are subjected to analog to digital (A/D) conversion, and a plurality of pieces of digital data (captured image data) are obtained simultaneously. Though the number of image capturing units is two here, the number of image capturing units is not limited to two, and the present exemplary embodiment is applicable irrespective of the number as long as the image capturing apparatus has a plurality of image capturing units. As used herein, the term "unit" generally refers to any combination of software, firmware, hardware, or other component, such as circuitry, that is used to effectuate a purpose.

Figure 2:
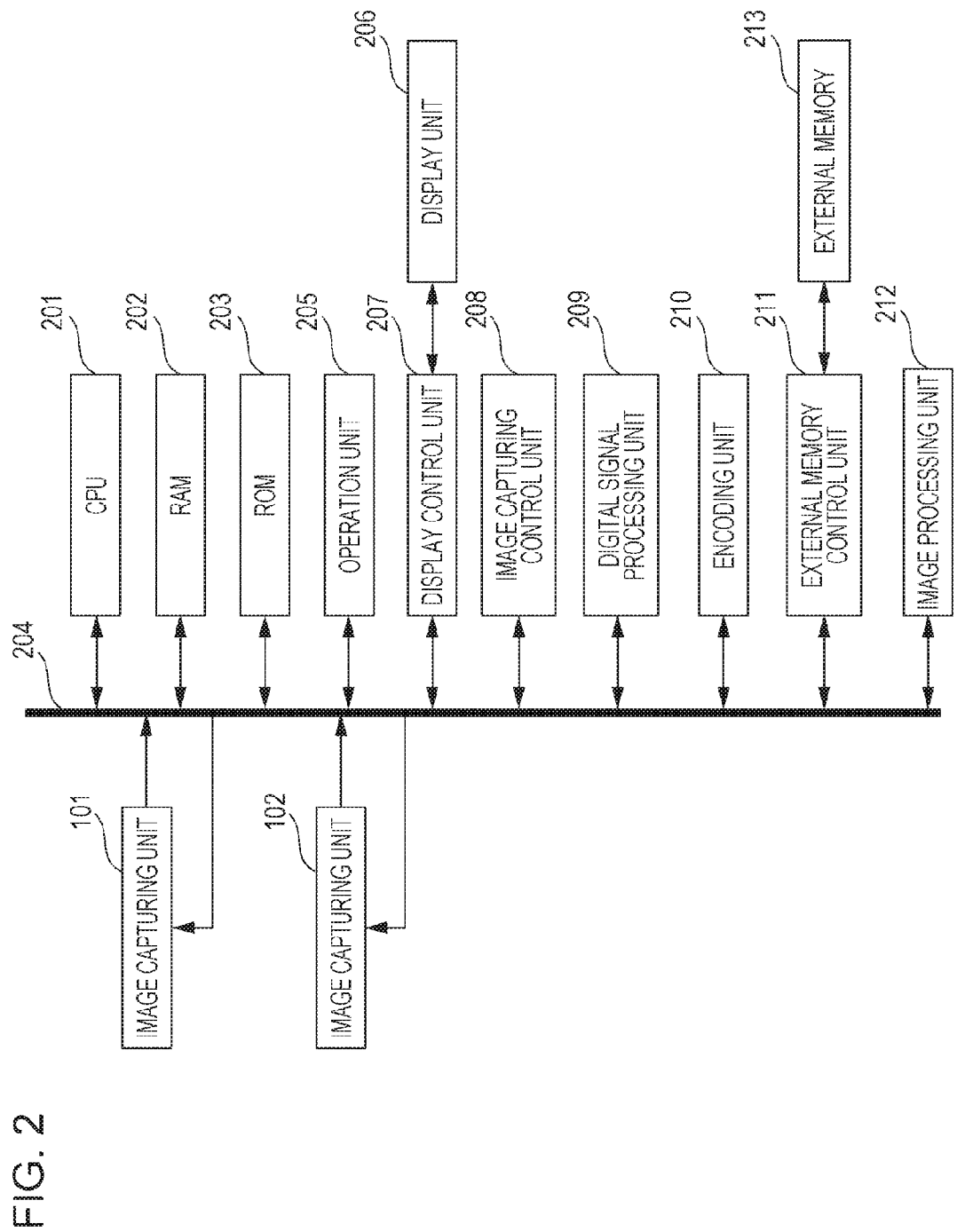
FIG. 2 is a block diagram illustrating one example of an inner configuration of the image capturing apparatus.

FIG. 2 is a block diagram illustrating an inner configuration of the image capturing apparatus 100. A central processing unit (CPU) 201 is a processing circuit which may include one or more processors, and totally controls each unit described below. A random access memory (RAM) 202 is one or more memories which function as a main memory, a work area, and the like of the CPU 201. A read-only memory (ROM) 203 is one or more memories in which a control program and the like which are executed by the CPU 201 are stored. A bus 204 is a transfer path of various data, and, for example, captured image data acquired by the image capturing units 101 and 102 is sent to each processing unit in the image capturing apparatus 100 via the bus 204. An operation unit 205 is an operation unit for receiving an instruction of the user, such as a button or a mode dial, and the user is able to give an instruction of image capturing or an instruction of zooming to the image capturing apparatus 100 by an operation on the operation unit 205. A display unit 206 is a display for displaying an image which is captured or a character. The display unit 206 may have a touch screen function, and, in this case, a user instruction by using a touch screen, such as the instruction of image capturing or the instruction of zooming, may be handled as an input of the operation unit 205.

A display control unit 207 is a processing circuit which performs display control of the image or the character which is displayed on the display unit 206. An image capturing control unit 208 is a processing circuit which performs control of the image capturing units 101 and 102 based on an instruction from the CPU 201, such as focus, opening or closing of a shutter, adjustment of an aperture. A digital signal processing unit 209 is a processing circuit which performs various processing such as white balance processing, gamma processing, or noise reduction processing, for the captured image data received via the bus 204.

An encoding unit 210 is a processing circuit which performs processing of converting the captured image data into a file format such as a Joint Photographic Experts Group (JPEG) or a Moving Picture Experts Group (MPEG). An external memory control unit 211 is an interface for connecting the image capturing apparatus 100 to an external memory 213 (for example, a personal computer (PC), a hard disk, or a storage medium such as a memory card, a Compact Flash (CF) card, a Standard Definition (SD) card, or a Universal Serial Bus (USB) memory). An image processing unit 212 performs image processing such as image composition by using a captured image data group acquired by the image capturing units 101 and 102 or a captured image data group output from the digital signal processing unit 209. For example, by using a plurality of pieces of image data, each of which has a different angle of view, and a virtual angle of view set by the instruction of zooming of the user, virtual-angle-of-view image data corresponding to the virtual angle of view is generated. Note that, though there are components of the image capturing apparatus 100 other than the above, since they are not a main point of the present exemplary embodiment, description thereof will be omitted.

Figure 3:
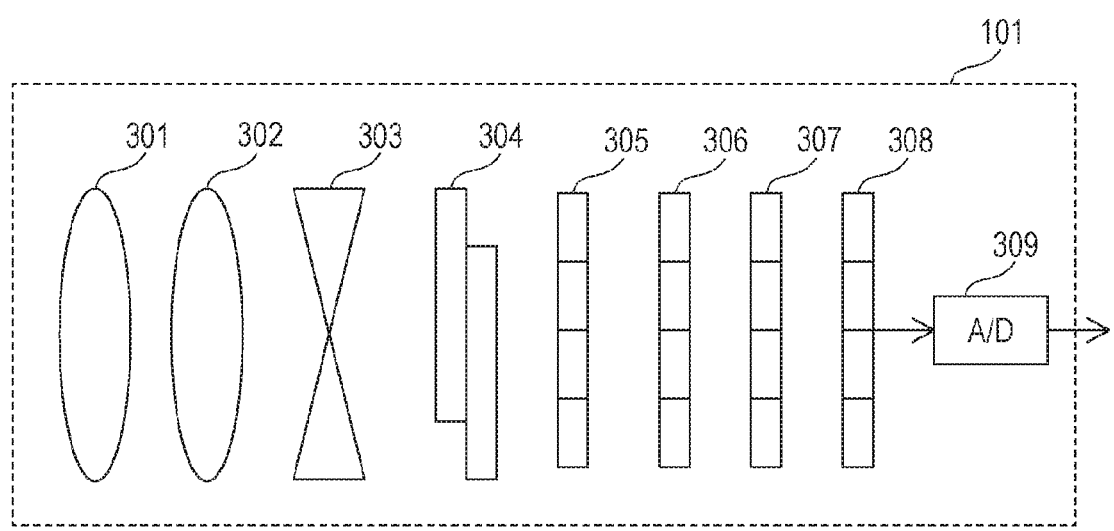
FIG. 3 is a view illustrating one example of an inner configuration of the image capturing unit.

FIG. 3 is a view illustrating an inner configuration of the image capturing unit 101. The image capturing unit 101 is composed of lenses 301 and 302, an aperture 303, a shutter 304, an optical low-pass filter 305, an infrared (IR) cut filter 306, a color filter 307, a sensor 308, and an A/D transforming unit 309. The lenses 301 and 302 are a focus lens 301 and a blur correction lens 302, respectively. The sensor 308 is a sensor of, for example, a Complementary Metal-Oxide Semiconductor (CMOS), a Charge-Coupled Device (CCD), or the like, and senses a light amount of an object which is focused by each of the lenses 301 and 302 described above. The sensed light amount is output as an analogue value from the sensor 308, converted into a digital value by the A/D transforming unit 309, and becomes digital data to be output to the bus 204. Note that, since a configuration of the image capturing unit 102 is similar to that of the image capturing unit 101 except for focal lengths of the lenses 301 and 302, description thereof will be omitted.

Figure 4:
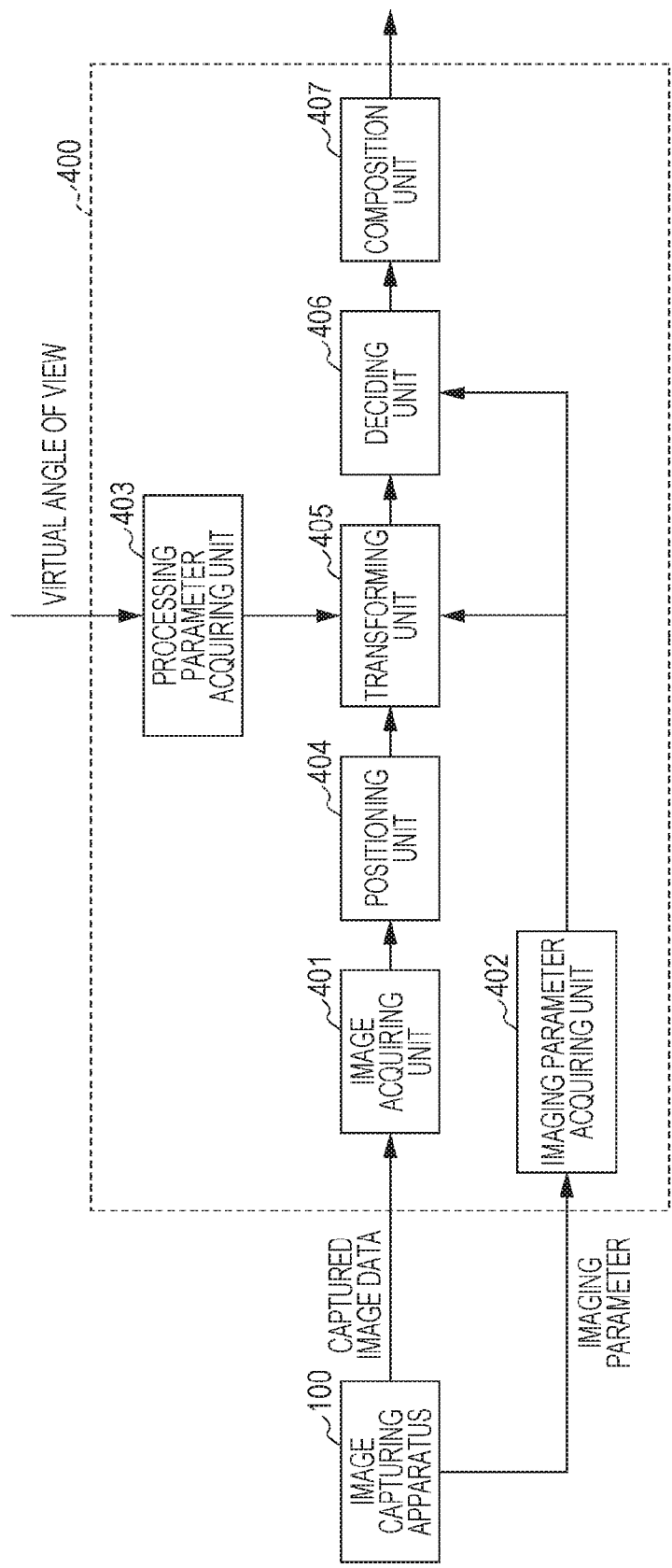
FIG. 4 is a block diagram illustrating a functional configuration of the image capturing apparatus according to the exemplary embodiment 1.
Figure 5:
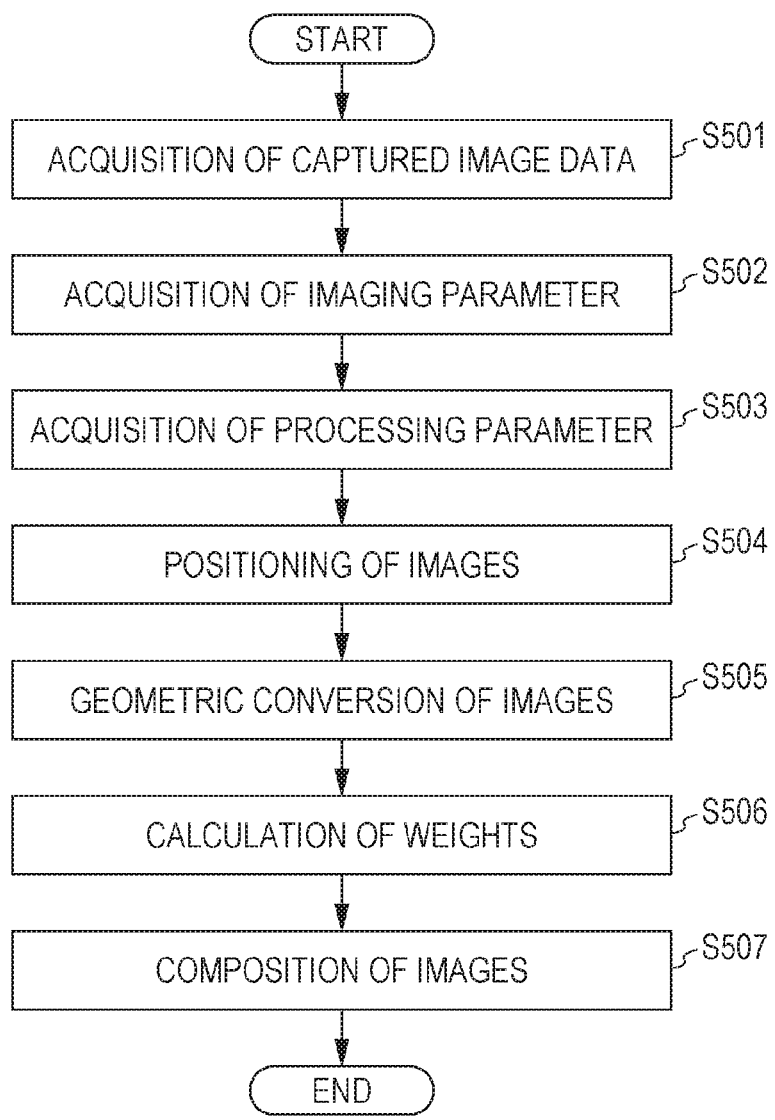
FIG. 5 is a flowchart illustrating a flow of processing performed in the image capturing apparatus according to the exemplary embodiment 1.

Next, a flow of processing performed in the image capturing apparatus 100 of the present exemplary embodiment will be described with reference to FIGS. 4 and 5. FIG. 4 is a functional block diagram of the image processing unit 212. When the CPU 201 executes a program read out from the ROM 203 with the RAM 202 as a work memory and controls the image processing unit 212, the image processing unit 212 functions as each of functional blocks illustrated in FIG. 4. Note that, the image capturing apparatus 100 may include a dedicated processing circuit corresponding to each of the functional blocks illustrated in FIG. 4. FIG. 5 is a flowchart illustrating the flow of the processing executed by the image processing unit 212. Description will be given below by assuming that a virtual angle of view $\theta'$ is within a range which satisfies $\theta_2 \leq \theta' \leq \theta_1$.

At step S501, an image acquiring unit 401 acquires captured image data input from the image capturing units 101 and 102 and outputs it to a positioning unit 404. Hereinafter, it is set that an image captured by the image capturing unit 101 is $I_1(x, y)$, and an image captured by the image capturing unit 102 is $I_2(x, y)$. First, in the image data acquiring processing at step S501, the image acquiring unit 401 acquires captured image data of the plurality of images $I_1(x, y)$ and $I_2(x, y)$, which are respectively captured by the image capturing units 101 and 102, from the image capturing units 101 and 102. The captured image data may be acquired directly from the image capturing units 101 and 102, or may be acquired by reading out one stored in the RAM 202 or the external memory 213. The image acquiring unit 401 outputs the acquired captured image data to the positioning unit 404.

At step S502, an imaging parameter acquiring unit 402 acquires an imaging parameter, which includes the angle of view $\theta_1$ of the image capturing unit 101, the angle of view $\theta_2$ of the image capturing unit 102, and the interval R between the image capturing unit 101 and the image capturing unit 102, from a storage device such as the ROM 203 or the external memory 213. The imaging parameter acquiring unit 402 outputs the acquired imaging parameter to the positioning unit 404, a transforming unit 405, and a deciding unit 406.

At step S503, a processing parameter acquiring unit 403 acquires a processing parameter, which includes the virtual angle of view $\theta'$, based on an output from the operation unit 205. Note that, a user inputs the virtual angle of view $\theta'$ by an operation on the operation unit 205. For example, a change in an angle of view may be estimated according to an operation on a zoom button of the image capturing apparatus 100, or the user may directly input a numerical value of a desired angle of view. The processing parameter acquiring unit 403 outputs the acquired processing parameter to the positioning unit 404, the transforming unit 405, and the deciding unit 406.

At step S504, the positioning unit 404 performs positioning of the images by using the captured image data input from the image acquiring unit 401, the imaging parameter input from the imaging parameter acquiring unit 402, and the processing parameter input from the processing parameter acquiring unit 403. The images $I_1(x, y)$ and $I_2(x, y)$ subjected to the positioning are set as images $J_1(x, y)$ and $J_2(x, y)$. Note that, processing of the positioning performed here will be described in detail below. The positioning unit 404 outputs the images $J_1(x, y)$ and $J_2(x, y)$, for which the positioning has ended, to the transforming unit 405.

Figure 6:
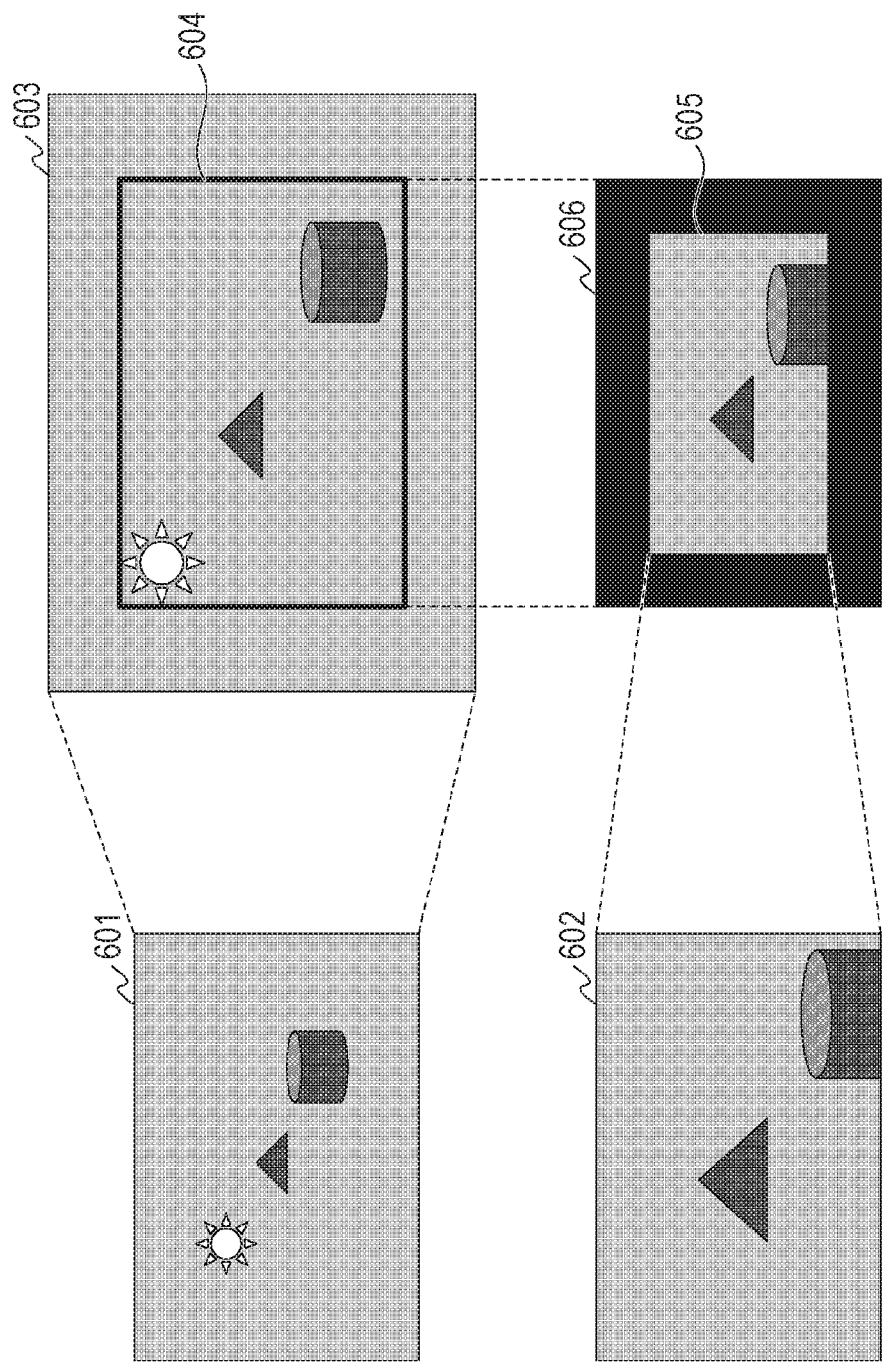
FIG. 6 is a conceptual diagram of image transformation processing.

At step S505, the transforming unit 405 performs enlargement (reduction) processing in accordance with the virtual angle of view $\theta'$ for the images $J_1(x, y)$ and $J_2(x, y)$ which are input from the positioning unit 404. A concept of this processing is illustrated in FIG. 6. In FIG. 6, an image 601 is the image $J_1$ after viewpoint registration, and an image 602 is the image $J_2$ after viewpoint registration. As assumed above, the angle of view $\theta_1$ of the image capturing unit 101 is equal to or more than the virtual angle of view $\theta'$, and the angle of view $\theta_2$ of the image capturing unit 102 is equal to or less than the virtual angle of view $\theta'$. An image 603 is obtained by enlarging the image 601 $\tan\theta_1/\tan\theta'$ times, and an image 604 is obtained by applying cropping to a region corresponding to the virtual angle of view $\theta'$ in the image 603. Moreover, an image 605 is obtained by reducing the image 602 $\tan\theta_2/\tan\theta'$ times, and an image 606 is an image obtained by filling a periphery of the image 605 with 0 so as to correspond to the virtual angle of view $\theta'$. The transforming unit 405 generates the image 604 and the image 606 in a case where the images $J_1(x, y)$ and $J_2(x, y)$ input from the positioning unit 404 are set as the image 601 and the image 602, respectively. Hereinafter, the image 604 and the image 606 are represented as $K_1(x, y)$ and $K_2(x, y)$, respectively. The transforming unit 405 outputs the generated images $K_1(x, y)$ and $K_2(x, y)$ to the deciding unit 406 and a composition unit 407.

At step S506, the deciding unit 406 decides weight coefficients to use for composition, based on characteristics of the angle of view $\theta_1$ of the image capturing unit 101, the angle of view $\theta_2$ of the image capturing unit 102, the virtual angle of view $\theta'$ included in the processing parameter, and captured image data of the images $K_1(x, y)$ and $K_2(x, y)$ subjected to the transformation. Detail of processing performed here will be described below. The deciding unit 406 outputs a weight coefficient $w_1(x, y)$ corresponding to the image $K_1(x, y)$ and a weight coefficient $w_2(x, y)$ corresponding to the image $K_2(x, y)$, which are decided here, to the composition unit 407.

Finally, at step S507, the composition unit 407 multiplies the images $K_1(x, y)$ and $K_2(x, y)$ by the weight coefficients $w_1(x, y)$ and $w_2(x, y)$, respectively, and performs additive composition according to a following formula.

$$I_{synth}(x,y)=[w_1(x,y)K_1(x,y)+w_2(x,y)K_2(x,y)]/[w_1(x,y)+w_2(x,y)] \qquad (1)$$

The composition unit 407 outputs the generated composition image data $I_{synth}(x, y)$ to the storage device such as the RAM 202 and ends the processing.

The above is the flow of the processing performed in the image capturing apparatus 100 of the present exemplary embodiment. Next, detail of the processing in each of the steps will be described.

[Processing of Positioning Unit 404]

First, the processing performed in the positioning unit 404 (step S504) will be described in detail. The positioning unit 404 performs positioning of the captured image $I_1$ and the captured image $I_2$. Since the angle of view $\theta_1$ of the image capturing unit 101 is great compared to the angle of view $\theta_2$ of the image capturing unit 102 in the present exemplary embodiment, a viewpoint of the image $I_2$ of the image capturing unit 102 is to be registered at a viewpoint of the image capturing unit 101. The positioning unit 404 enlarges the image $I_1$ of the image capturing unit 101 $\tan\theta_1/\tan\theta_2$ times as a relation of the image 601 and the image 603 of FIG. 6, and applies cropping thereto, and the resultant image is set as $I_1'$.

Next, disparity in each pixel (region) of the image $I_2(x, y)$ and the image $I_1'(x, y)$ is obtained. At this time, the disparity is obtained only for the region of the image 604, in an example illustrated in FIG. 6. As a method of obtaining the disparity, a method of block matching which is known is used. The block matching is a method by which an image block having the highest similarity to an image region in which a criterion image is included is derived from a reference image. From a difference of positions of image regions corresponding to each other, which are derived, in the images, it is possible to obtain disparity $(d_x(x, y), d_y(x, y))$ of the image $I_2$ with respect to the image $I_1'$, which corresponds to each pixel position. The method is not limited to the block matching as long as disparity is able to be obtained for each pixel (region), and a method of graph cut or the like may be used, for example. Lastly, by shifting the image $I_2(x, y)$ by an amount of disparity $(-d_x(x, y), -d_y(x, y))$, $$I'_2(x,y)=I_2(x+d_x(x,y),y+d_y(x,y)) \qquad (2)$$

is provided, and an image obtained by registering the viewpoint of the image $I_2$ of the image capturing unit 102 at that of the image capturing unit 101 is obtained. Note that, the method of positioning images $I_1$ and $I_2$ is not limited to the above, and, for example, by using a distance sensor using infrared radiation to thereby acquire a distance to an object, an image may be shifted based on the acquired distance and an interval between respective image capturing units 101 and 102. The images each of which has the viewpoint registered in the above-described manner are set as $J_1(x, y)$ and $J_2(x, Y)$, respectively. The above is the processing performed in the positioning unit 404.

[Processing of Deciding Unit 406]

Figure 7:
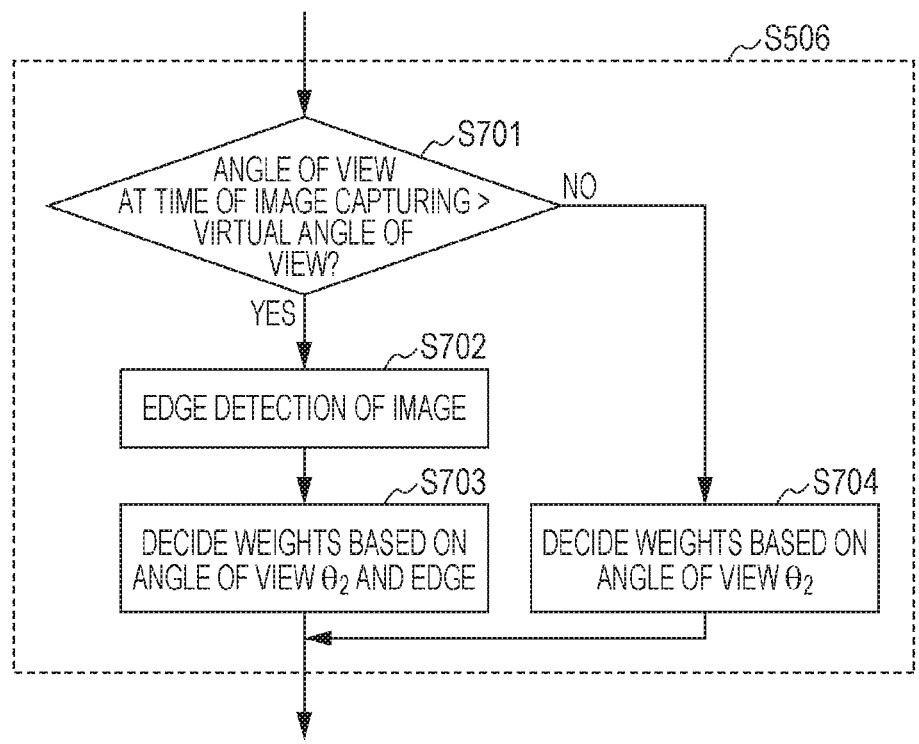
FIG. 7 is a flowchart illustrating a flow of weight decision processing performed in a deciding unit of the exemplary embodiment 1.

Next, the processing in the deciding unit 406 (step S506) will be described in detail. FIG. 7 is a flowchart illustrating the processing of the deciding unit 406. At step S701, as to each image which is input, the deciding unit 406 judges whether an angle of view at a time of image capturing is greater than the virtual angle of view θ'. In a case where the angle of view at the time of image capturing is greater than the virtual angle of view θ' (in the present exemplary embodiment, in a case where image capturing is performed by the image capturing unit 101), the procedure moves to step S702. In a case where the angle of view at the time of image capturing is smaller than the virtual angle of view θ', the procedure moves to step S704.

At step S702, the deciding unit 406 performs detection processing of an edge of an image. Here, as to the edge, by using a following Sobel filter of $$h_h = \begin{pmatrix} 1 & 2 & 1 \\ 0 & 0 & 0 \\ -1 & -2 & -1 \end{pmatrix} h_v = \begin{pmatrix} 1 & 0 & -1 \\ 2 & 0 & -2 \\ 1 & 0 & -1 \end{pmatrix}, \quad (3)$$

intensity is calculated with a formula of $$G(x,y) = \sqrt{(h_h * I)^2 + (h_v * I)^2} \quad (4)$$

It is set that * denotes convolution and I denotes an image. When a value obtained from the formula (4) is equal to or more than a threshold T, it is judged that a target pixel is a pixel corresponding to the edge. In a case where a range of a pixel value is [0, 255], for example, T=20 is used as the threshold T. Note that, the method of edge detection is not limited to the Sobel filter above, and processing of, for example, edge detection may be performed by performing a differential operation with respect to the pixel value of the image.

At step S703, the deciding unit 406 decides a weight of composition as to each pixel of the image based on edge information detected at step S702. It is set here that weights of pixels included in a block having a size of s×s, which has a pixel included in a range of the angle of view θ$_2$ and detected as the edge at step S702 in the center thereof, are 0, and weights of other pixels are 1. For example, s=10 may be used for the block size s. That is, weights of a partial region in which the pixel detected as the edge is extended by the predetermined number of pixels are decided as 0. Then, the deciding unit 406 outputs the decided weights to the composition unit 407 and ends the processing.

At step S704, the deciding unit 406 sets a weight of an image region corresponding to the angle of view (θ$_2$) at a time of image capturing of a target image of weight decision as 1, and sets a weight of an image region which is not included in the range of the angle of view θ$_2$ as 0. Then, the deciding unit 406 outputs the decided weights to the composition unit 407 and ends the processing.

Figure 8:
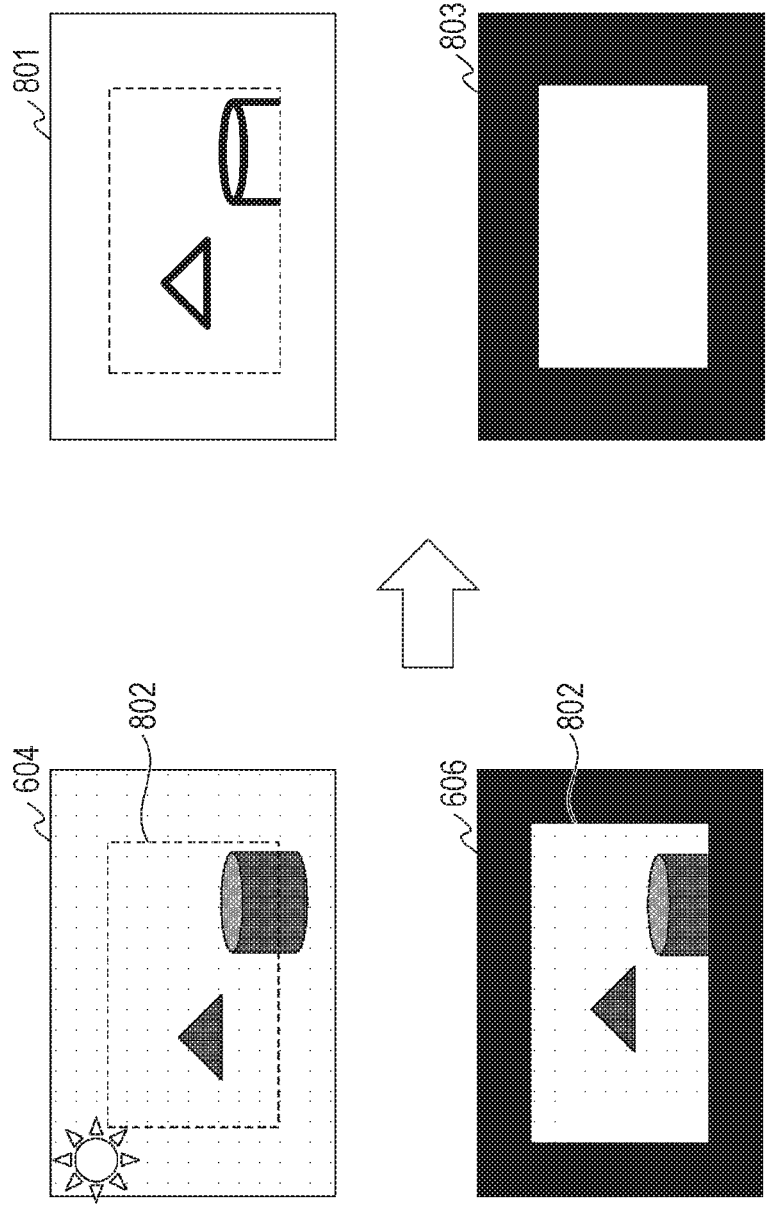
FIG. 8 is a conceptual diagram of a method of weight decision according to the exemplary embodiment 1.

A conceptual diagram of the method of deciding weights at steps S703 and S704 is illustrated in FIG. 8. In FIG. 8, a region 802 represents the range of the angle of view θ$_2$, an image 801 is a weight map illustrating a weight coefficient corresponding to each pixel of the image 604, and an image 803 is a weight map illustrating a weight coefficient corresponding to each pixel of the image 606. In the image 801 and the image 803, a weight coefficient of 1 and a weight coefficient of 0 are stored in a white region and a black part, respectively. In a case where the angle of view at the time of image capturing is greater than the virtual angle of view θ', a weight of an edge region, which includes a pixel detected as the edge among pixels included in the region 802, becomes 0 and weights of the other pixels become 1. That is, in a region other than the edge region in the region 802, a weight of an image of a telephotography side and a weight of an image of a wide-angle photography side becomes 1:1. Moreover, in a case where the angle of view at the time of image capturing is smaller than the virtual angle of view θ', weights of all of the pixels included in the region 802 are 1, and weights of all of the pixels outside the region 802 are 0. In this manner, by deciding a final pixel value of the image without using the pixel value of the image of the wide angle in the edge region of the image and by using also the pixel value of the image of the wide angle in a region other than the edge region of the image, it is possible to generate an image in which noise is reduced and a sense of resolution of an image of telephotography is remained.

Note that, in the present exemplary embodiment, the image acquiring unit 401 functions as an acquiring unit configured to acquire a first image which is captured by a first image capturing unit having a first angle of view and a second image which is captured by a second image capturing unit having a second angle of view smaller than the first angle of view. Moreover, the positioning unit 404 and the transforming unit 405 function as a transforming unit configured to perform positioning and transformation of the first image and the second image so that images of the same object images are superposed. In addition, the deciding unit 406 functions as a detecting unit configured to perform processing of edge detection for detecting an edge of each of the images of the object in a region in which the first image and the second image are superposed. Further, the deciding unit 406 functions also as a deciding unit configured to decide weights at a time of applying weighted composition to the first image and the second image which are subjected to the positioning and the transformation by the transforming unit. Furthermore, the composition unit 407 functions as a composition unit configured to apply weighted composition to the first image and the second image which are subjected to the positioning and the transformation by the transforming unit, by using the weights decided by the deciding unit.

Exemplary Embodiment 2

Figure 9:
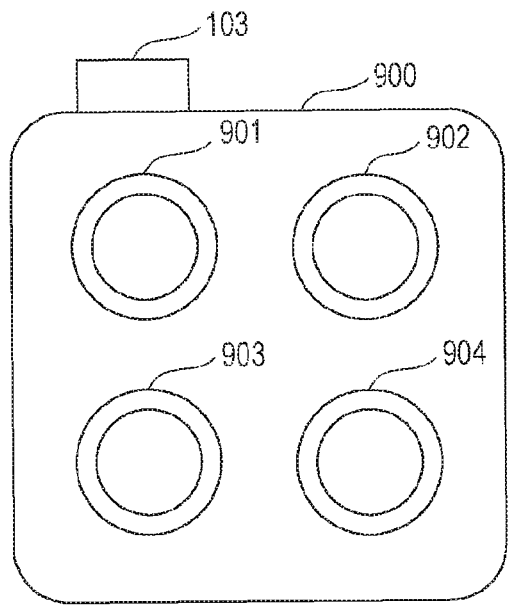
FIG. 9 is a view illustrating one example of an image capturing apparatus of a multi-camera type, which includes a plurality of image capturing units, according to an exemplary embodiment 2.
Figure 10:
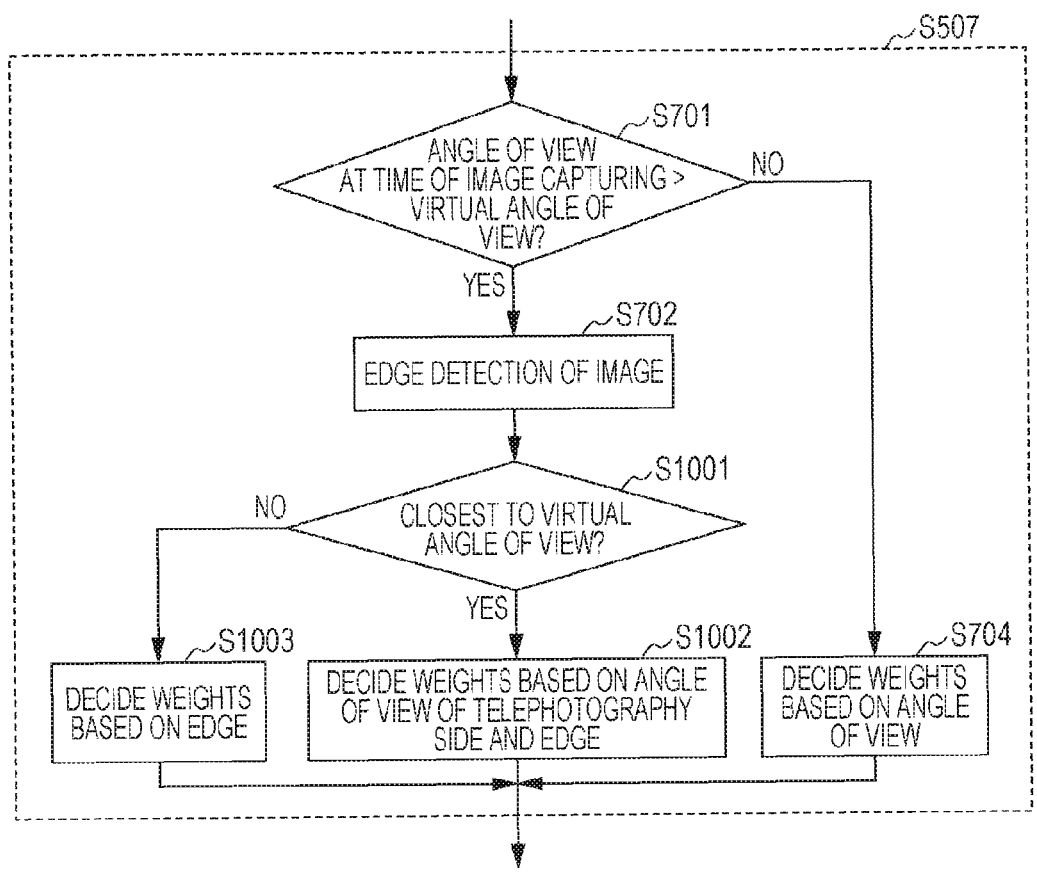
FIG. 10 is a flowchart illustrating a flow of weight decision processing performed in a deciding unit of the exemplary embodiment 2.

Though the case where there are two types of angles of view of the image capturing units has been described in the exemplary embodiment 1, a case where three or more types of image capturing units each of which has an angle of view different from the others will be described in the present exemplary embodiment. FIG. 9 is a view illustrating one example of an image capturing apparatus according to the present exemplary embodiment. As illustrated in FIG. 9, an image capturing apparatus 900 is provided with four image capturing units 901 to 904 which acquire color image data. The image capturing units 901 to 904 are arranged so that respective optical axes thereof are parallel. In the present exemplary embodiment, it is set that angles of view of the image capturing unit 901 to the image capturing unit 904 are $\theta_1$ to $\theta_4$, respectively, and a size relation of the angles of view is $\theta_1 > \theta_2 > \theta_3 > \theta_4$. That is, the image capturing unit 901 has the greatest angle of view, and the image capturing unit 904 has the smallest angle of view. Moreover, the virtual angle of view $\theta'$ satisfies a relation of $\theta_1 > \theta_2 > \theta' > \theta_3 > \theta_4$. Though basic processing in the present exemplary embodiment is similar to that of the exemplary embodiment 1, a content of processing of weight decision at step S506 is different. FIG. 10 is a flowchart illustrating a flow of the processing of step S506 in the present exemplary embodiment. Reference signs similar to those of FIG. 7 are assigned to processing similar to that of the exemplary embodiment 1, and description thereof will be omitted.

At step S1001, the deciding unit 406 judges whether an angle of view at a time of image capturing of a target image of weight decision is the angle of view wider than the virtual angle of view $\theta'$ and the closest to the virtual angle of view $\theta'$ among the angles of view of the image capturing units 901 to 904. In the case of the present exemplary embodiment, the angle of view which is wider than the virtual angle of view $\theta'$ and the closest to the virtual angle of view $\theta'$ is $\theta_2$. When the angle of view at the time of image capturing of the target image of weight decision is $\theta_2$, the procedure moves to step S1002. When the angle of view at the time of image capturing of the target image of weight decision is not $\theta_2$, the procedure moves to step S1003.

At step S1002, the deciding unit 406 decides a weight of composition as to each pixel in the image based on the edge information detected at step S702. Here, in the target image of weight decision, a weight of a region which is not included in an angle of view which is smaller by one stage than the angle of view at the time of image capturing of the target image of weight decision (in the present exemplary embodiment, $\theta_3$) among the angles of view of the image capturing units 901 to 904 is decided as 1. Weights of pixels included in a block having a size of s×s, which has a pixel included in a range of the angle of view $\theta_3$ and detected as the edge at step S702 in the center thereof, are set as 0, and weights of other pixels are set as 1. Then, the deciding unit 406 outputs the decided weight coefficients to the composition unit 407 and ends the processing.

At step S1003, the deciding unit 406 decides a weight of composition as to each pixel of the image based on the edge information detected at step S702. At this step, performed is processing of deciding that, in an entire region in the image, weights of pixels included in the block having the size of s×s, which has the pixel detected as the edge in the center thereof, are 0, and weights of other pixels are 1. Then, the deciding unit 406 outputs the decided weight coefficients to the composition unit 407 and ends the processing.

Figure 11:
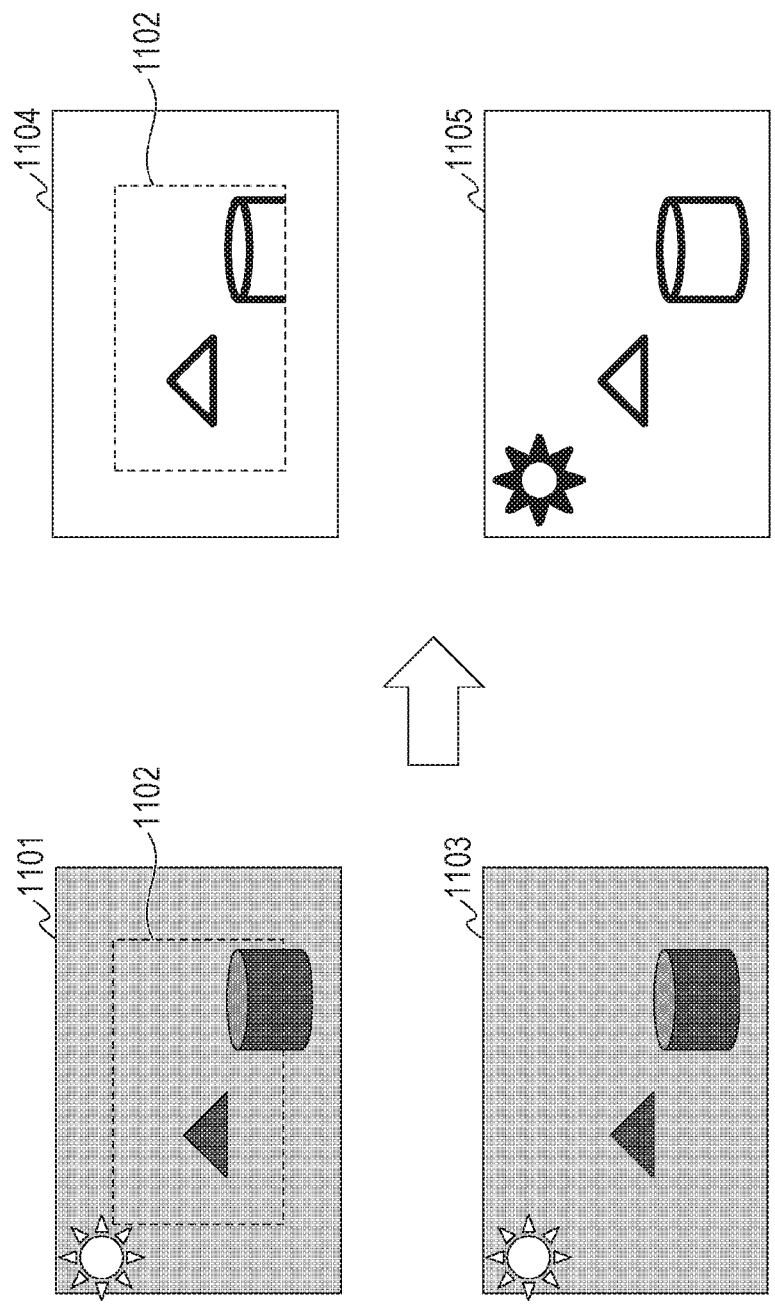
FIG. 11 is a conceptual diagram of a method of weight decision according to the exemplary embodiment 2.

FIG. 11 is a view illustrating a concept of weight decision processing performed at step S1002 and step S1003. In FIG. 11, an image 1101 illustrates an image obtained by applying transformation processing to an image captured by the image capturing unit 902 (angle of view $\theta_2$), and an image 1103 illustrates an image obtained by applying transformation processing to an image captured by the image capturing unit 901 (angle of view $\theta_1$). A region 1102 represents a range of an angle of view of the angle of view $\theta_3$ which is the angle of view smaller than the virtual angle of view $\theta'$ and the closest to the virtual angle of view $\theta'$ among the angles of view of image capturing of the image capturing units 901 to 904. An image 1104 is a weight map illustrating a weight coefficient corresponding to each pixel of the image 1101. In a case where the angle of view at the time of image capturing of the target image of weight decision is the closest to the virtual angle of view $\theta'$ among the angles of view greater than the virtual angle of view $\theta'$ (in a case where the angle of view is the angle of view $\theta_2$), an image having the highest sense of resolution is obtained in a range which is not included in the region 1102. Then, a weight of an edge region is set as 0 only in the region 1102, and a weight in a range which is not included in the region 1102 is set as 1 even in the edge region. On the other hand, in a case where the angle of view at the time of image capturing of the target image of weight decision is not the closest to the virtual angle of view $\theta'$ among the angles of view greater than the virtual angle of view $\theta'$, the sense of resolution is inferior in an entire region within the virtual angle of view $\theta'$ compared to that in the other images. Thus, a weight of the edge region is set as 0 in the entire area in the image.

The above is a summary of the weight decision processing in the present exemplary embodiment. With the processing above, even in the case where there are three or more types of angles of view of images which are to be subjected to composition, it is possible to suppress degradation in the sense of resolution and perform noise reduction by image composition.

Exemplary Embodiment 3

In the exemplary embodiment 1 and the exemplary embodiment 2, the deciding unit 406 decides the weight coefficients for the image having the angle of view at the time of image capturing, which is smaller than the virtual angle of view $\theta'$, as the weight map 803 of FIG. 8. However, when the weights are decided so that the weights suddenly change from 0 to 1 between an inside and an outside of a certain region in this manner, an amount of noise suddenly changes at a boundary where the number of images used for composition is switched, and a difference in a level of noise is generated. For example, in the case of the exemplary embodiment 1, since the number of images to be added is two in an inside of the region 802 and the number of images to be added is one in an outside of the region 802, an amount of noise increases in the outside of the region 802 compared to the inside of the region 802, so that the difference in the level of noise is generated.

Figure 12:
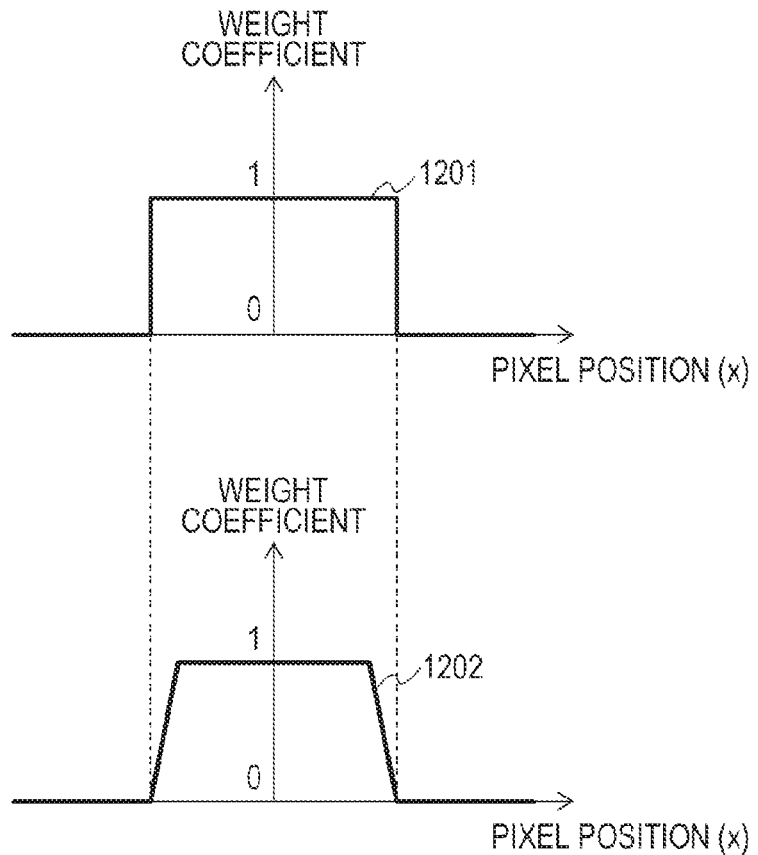
FIG. 12 is a conceptual diagram of a method of weight decision according to an exemplary embodiment 3.

Then, in the present exemplary embodiment, weight coefficients in a case where an angle of view at a time of image capturing is smaller than the virtual angle of view $\theta'$ are decided as follows. In FIG. 12, a graph 1201 is a sectional view of the weight map 803 in a horizontal direction. In the graph 1201, it is decided that a weight coefficient in the inside of the region 802 is 1 and a weight coefficient in the outside of the region 802 is 0. Meanwhile, a graph 1202 is a sectional view of a weight map weight coefficients of which are decided with a weight decision method in the present exemplary embodiment, in the horizontal direction. In the graph 1202, the weight coefficient is decided so as to gradually change from 1 to 0 as being close to the boundary of the region 802 in the inside of the region 802. Note that, in an example of FIG. 12, a weight value is decided so that the weight coefficient changes along a straight line, but it is not necessary to decide the weight coefficient so as to change along a straight line as long as the weight coefficient is decided so as to gradually change as being close to the boundary. The decision may be made so that the weight value changes along, for example, a spline curve or a sigmoid function. In addition, though only the sectional view of the weight map in the horizontal direction is illustrated in FIG. 12, a weight is similarly decided also in a vertical direction so that the weight gradually changes.

As above, when deciding a weight for an image having an angle of view at a time of image capturing, which is smaller than the virtual angle of view θ', by deciding the weight so that the weight gradually changes at a boundary between a region in which a weight coefficient is 0 and a region in which a weight coefficient is 1, it is possible to reduce a difference in a level of noise.

Exemplary Embodiment 4

Figure 13:
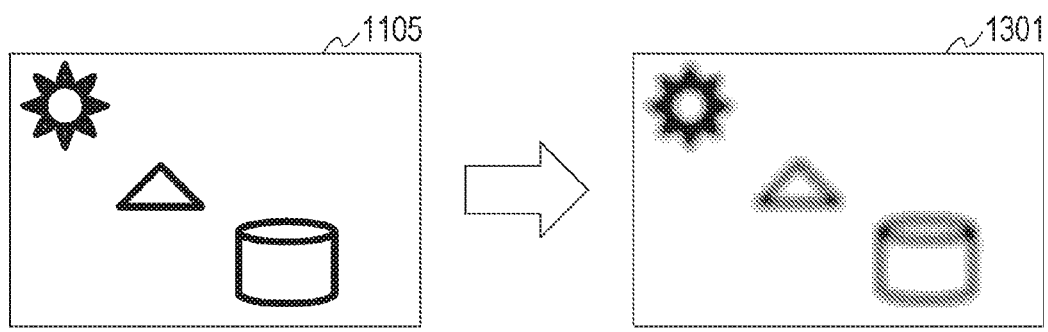
FIG. 13 is a conceptual diagram of a method of weight decision according to an exemplary embodiment 4.

In the exemplary embodiment 1 and the exemplary embodiment 2, the weight coefficients for the image having the angle of view at the time of image capturing, which is larger than the virtual angle of view θ', are decided so that the weight coefficient of the edge region is 0. However, by simply setting the weight coefficient of the edge region as 0, the difference in the level of noise is generated in a periphery of the edge region as described in the exemplary embodiment 3. Then, in the present exemplary embodiment, a low-pass filter is applied to a weight map decided for an image having an angle of view at a time of image capturing, which is larger than the virtual angle of view θ', so that a weight coefficient gradually changes, in order to ease the difference in the level of noise. FIG. 13 is a view illustrating a summary of correction processing of a weight map in the present exemplary embodiment. In FIG. 13, an image 1301 is an image obtained by applying a low-pass filter to a weight map 1105. By applying a low-pass filter to a weight map in this manner, it is possible to ease a sudden change in a weight in an edge region, thus making it possible to reduce a difference in a level of noise in the edge region.

Note that, though the sudden change in the weight coefficient in the peripheral part of the edge is eased by applying the low-pass filter to the weight map here, another method may be used. For example, a weight coefficient w(x, y) may be represented as a function of an edge intensity which is, for example, defined by the formula (4). At this time, as the function of the edge intensity, adopted is a function such that the greater the edge intensity is, the smaller the weight coefficient becomes, and the weight coefficient becomes close to 1 in a solid part (in which the edge intensity is 0). For example, a following function is possible.

$$w(x, y) = \frac{1}{1 + G(x, y)} \quad (5)$$

In the formula (5), G(x, y) is the edge intensity defined with the formula (4). By deciding the weight in the edge region according to this formula, it is possible to reduce the difference in the level of noise in the edge region without applying the low-pass filter to the weight map.

Exemplary Embodiment 5

In exemplary embodiments 1 to 4, it is premised that an image having a small angle of view has higher resolution of an object image. However, when an angle of view of an image capturing unit becomes small, depth of field becomes shallow actually, so that there is a possibility that, in an image of a telephotography side, a blur occurs in an object which is out of a focus plane and resolution is degraded compared to an image of a wide-angle photography side. When such images are composited according to the methods of the exemplary embodiments 1 to 4, an image in which the blur in the telephotography side is reflected and which has poor resolution is generated, which causes a problem in a case where it is desired to give priority to a sense of resolution of an object over a natural blur of an image.

Figure 14:
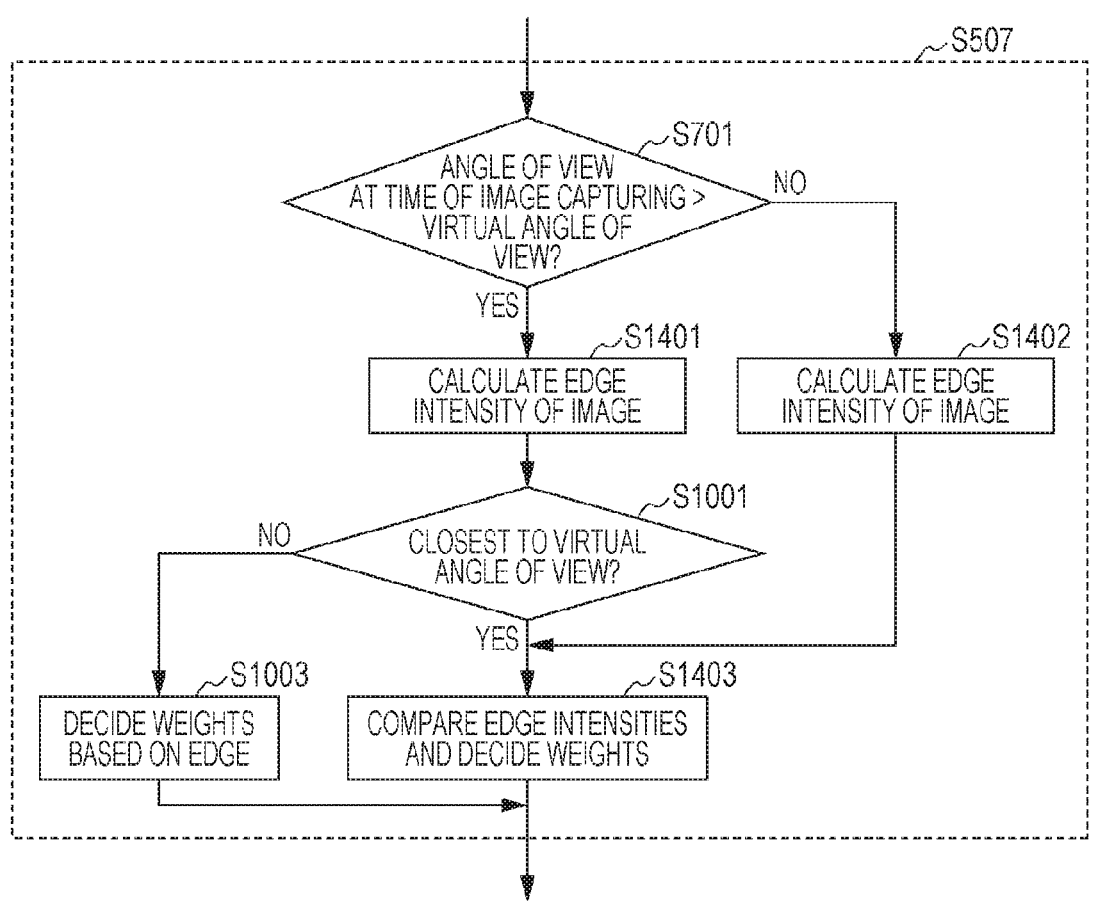
FIG. 14 is a flowchart illustrating a flow of weight decision processing performed in a deciding unit of an exemplary embodiment 5.

Then, in the present exemplary embodiment, described is an example in which the sense of resolution is maintained by comparing edge intensities of respective images to be subjected to composition and setting a weight for a region, which has a greater intensity, to be great. It is set that a configuration of an image capturing unit of an image capturing apparatus which is used here is similar to that of the exemplary embodiment 2. FIG. 14 is a flowchart illustrating a flow of processing of the deciding unit 406 in the present exemplary embodiment. Similar reference signs are assigned to processing similar to that of the exemplary embodiment 1 and the exemplary embodiment 2, and description thereof will be omitted.

At step S1401 and step S1402, the deciding unit 406 performs processing of edge detection of an image similarly to step S702. Unlike step S702, an edge intensity of a pixel which is detected as an edge is also held. In the case of performing processing of step S1401, the procedure moves to step S1001, and in the case of performing processing of step S1402, the procedure moves to step S1403. At step S1403, the deciding unit 406 compares the edge intensities calculated at step S1401 and step S1402, and decides weights. This processing will be described in detail.

Figure 15:
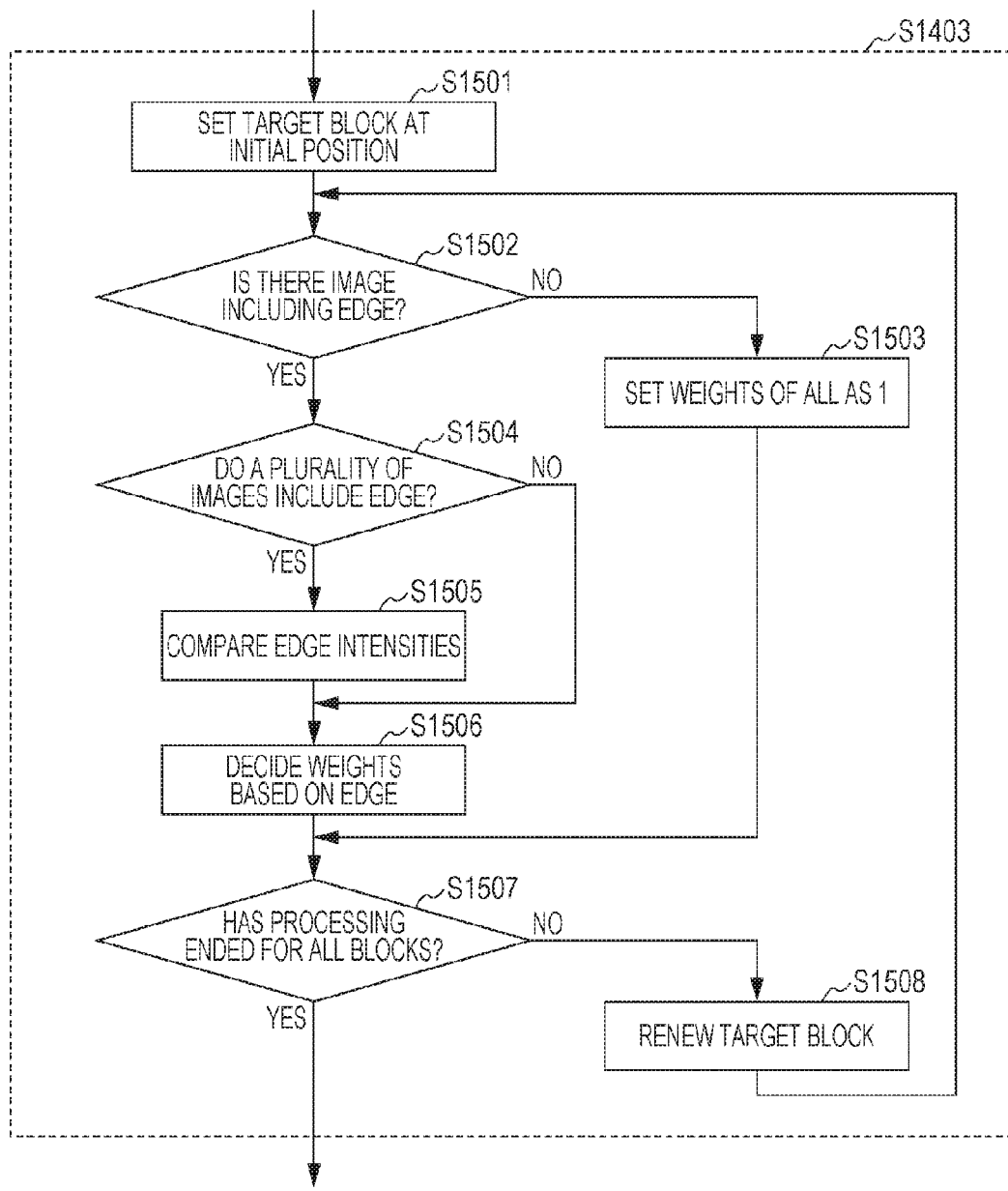
FIG. 15 is a flowchart illustrating a flow of weight decision processing based of comparison of edge intensities of the exemplary embodiment 5.

FIG. 15 is a flowchart representing a flow of the processing of step S1403. It is set that, at step S1403, an image is divided into a plurality of blocks which do not overlap with each other and processing is performed for each of the blocks. An order of blocks to be subjected to the processing starts from the left top of the image and sequentially shifts from the left top to the right bottom. The images targeted for the processing at step S1403 are an image having an angle of view at a time of image capturing, which is smaller than a virtual angle of view, and an image having an angle of view at the time of image capturing, which is larger than the virtual angle of view and the closest to the virtual angle of view.

At step S1501, the deciding unit 406 sets a block, for which calculation of a weight is performed, at an initial position. It is set here that setting is performed at an upper left end. At step S1502, the deciding unit 406 judges whether there is an image, in which a target block includes a region detected as an edge at step S1401 or S1402, among images targeted for weight decision at step S1403. In a case where it is judged that there is no image in which the target block includes the region detected as the edge at step S1401 or S1402, the procedure moves to step S1503. In a case where it is judged that there is an image in which the target block includes the region detected as the edge at step S1401 or S1402, the procedure moves to step S1504.

At step S1503, the deciding unit 406 sets weights of all pixels of the image targeted for weight decision at step S1403, which are included in the target block, as 1, and the procedure moves to step S1507.

At step S1504, the deciding unit 406 judges whether there are a plurality of images in which the target blocks include the edge. In a case where it is judged that there are a plurality of images in which the target blocks include the edge, the procedure moves to step S1505. In a case where it is judged that there are not a plurality of images in which the target blocks include the edge, the procedure moves to step S1506.

At step S1505, the deciding unit 406 compares edge intensities of the edge included in the target blocks, as to the plurality of images each of which is judged to have the target block including the edge. For example, the deciding unit 406 compares averages of edge intensities of pixels detected as the edge in the respective target blocks, and judges an image which has the largest average of the edge intensities in the block.

At step S1506, the deciding unit 406 decides weights of the target blocks based on the edge. The deciding unit 406 sets all weights of pixels of the target block of the only image in which the target block includes the edge or the image which has the greatest edge intensity among the plurality of images in which the target blocks include the edge as 1. Then, the deciding unit 406 sets all weights of pixels of the target block of an image other than the image, for which the weights are set as 1, as 0.

At step S1507, the deciding unit 406 judges whether the processing of weight decision has ended for all of the blocks in the images. In a case where it is judged that the processing of weight decision has ended for all of the blocks in the images, weight values which have been decided are output to the composition unit 407, and the processing ends. In a case where it is judged that the processing of weight decision has not ended for all of the blocks in the images, the procedure moves to step S1508. At step A1508, the target blocks are renewed, and the procedure returns to step S1502.

The above is the processing performed in the deciding unit 406 of the present exemplary embodiment. According to the processing above, even in a case where a blur occurs in an image of a telephotography side, it is possible to suppress reduction in a sense of resolution due to composition.

Another Exemplary Embodiment

Embodiments of the disclosure are not limited to the above-described exemplary embodiments. For example, in the above-described exemplary embodiments, weights are decided so that the weights of images are set as 1 or 0 based on an edge of an object image, but other weights may be used as long as a size relation of the weights is same as that of the above-described exemplary embodiments. For example, weights of an edge in an image of a wide-angle photography side may be set as a value other than 0 depending on how important each of a sense of resolution and a sense of noise is considered. Further, weights may be decided stepwisely in accordance with edge intensities.

The disclosure is able to be realized also by processing in which a program which realizes one or more functions of the above-described embodiments is supplied to a system or an apparatus via a network or a storage medium and one or more processors of a computer in the system or the apparatus reads out and executes the program. In addition, the disclosure is able to be realized also by a circuit which realizes one or more functions (for example, an ASIC).

According to the disclosure, it is possible to suppress degradation in resolution in a case where noise reduction is performed by compositing images each of which has a different angle of view.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-047631, filed on Mar. 10, 2015 which is hereby incorporated by reference herein in its entirety.

What is claimed is:

1. An image processing apparatus, comprising:
an acquiring unit configured to acquire a first image which is captured by a first image capturing unit having a first angle of view and a second image which is captured by a second image capturing unit having a second angle of view smaller than the first angle of view, the second image including an image of an object same as that in the first image;
a transforming unit configured to perform positioning and transformation of the first image and the second image such that images of the same object are superposed;
a detecting unit configured to perform processing of edge detection for detecting an edge of each of the images of the object in a region in which the first image and the second image are superposed;
a deciding unit configured to decide weights at a time of applying weighted composition to the first image and the second image which are subjected to the positioning and the transformation by the transforming unit; and
a composition unit configured to apply the weighted composition to the first image and the second image which are subjected to the positioning and the transformation by the transforming unit, by using the weights decided by the deciding unit, wherein
the deciding unit decides the weights such that a weight of the first image with respect to the second image in a partial region including a region, which is detected as the edge by the detecting unit, is smaller than a weight of the first image with respect to the second image in a region other than the partial region.

2. The image processing apparatus according to claim 1, wherein
the deciding unit generates a weight map indicating a weight in each pixel of the first image to apply a low-pass filter to the generated weight map, and the composition unit performs the weighted composition by using the weight map to which the low-pass filter is applied.

3. The image processing apparatus according to claim 1, wherein
the detecting unit derives an edge intensity of the image of the object each in the first image and the second image, and
the deciding unit decides the weights of the first image and the second image such that the greater edge intensity an image region has, the greater the weight becomes.

4. The image processing apparatus according to claim 1, wherein
the detecting unit derives an edge intensity of the object image each in the first image and the second image, and
detects a region, in which the derived edge intensity exceeds a predetermined threshold, as an edge.

5. The image processing apparatus according to claim 1, wherein the partial region is a region in which the region detected as the edge by the detecting unit is extended by the predetermined number of pixels.

6. The image processing apparatus according to claim 1, wherein the detecting unit performs the processing of edge detection by using a Sobel filter.

7. The image processing apparatus according to claim 1, wherein the deciding unit sets the weight of the first image in the partial region as 0 and the weight of the first image in the region other than the partial region as a value other than 0.

8. The image processing apparatus according to claim 7, wherein the deciding unit sets, in the region in which the first image and the second image are superposed, a ratio of the weight of the first image and the weight of the second image in the region other than the partial region as one to one.

9. The image processing apparatus according to claim 1, further comprising
an input unit configured to input a virtual angle of view which is smaller than the first angle of view and larger than the second angle of view, wherein
the transforming unit further applies cropping to an image region of the first image, which is in an outside of an image region corresponding to the virtual angle of view input by the input unit, and
the composition unit performs composition of the first image and the second image, which are subjected to the positioning and the transformation by the transforming unit, to thereby generate image data corresponding to the virtual angle of view.

10. The image processing apparatus according to claim 9, wherein
the acquiring unit further acquires a third image including the same object as that of the first image and the second image, which is captured by a third image capturing unit having a third angle of view larger than the first angle of view,
the transforming unit further performs positioning and transformation of the third image such that an image of the same object is superposed with those of the first image and the second image,
the detecting unit further performs processing of edge detection for detecting an edge of each of the images of the object in a region in which the first image and the third image are superposed,
the deciding unit further decides a weight of the third image at a time of applying weighted composition to the first image, the second image, and the third image, the composition unit applies the weighted composition to the first image, the second image, and the third image which are subjected to the positioning and the transformation by the transforming unit, by using the weights decided by the deciding unit, and
the deciding unit decides the weights such that, in an image region in which the first image is superposed with the third image and is not superposed with the second image, a weight of the third image with respect to the first image in a partial region including a region, which is detected as the edge by the detecting unit, is smaller than a weight of the third image with respect to the first image in a region other than the partial region.

11. The image processing apparatus according to claim 10, wherein the deciding unit decides the weights such that, in a region in which the first image, the second image, and the third image are superposed, a weight of the third image with respect to the second image in a partial region including the region, which is detected as the edge by the detecting unit, is smaller than a weight of the third image with respect to the second image in a region other than the partial region.

12. An image processing apparatus, comprising:
an acquiring unit configured to acquire a plurality of images obtained by performing image capturing of a same object by using image capturing units each of which has a different focal length;
a transforming unit configured to perform positioning and transformation for the plurality of images such that images of the same object are superposed;
a deriving unit configured to detect edges of the images of the object and derive edge intensities of the detected edges;
a deciding unit configured to decide weights at a time of applying weighted composition to the plurality of images which are subjected to the positioning and the transformation by the transforming unit; and
a composition unit configured to apply weighted composition to the plurality of images which are subjected to the positioning and the transformation by the transforming unit, by using the weights decided by the deciding unit, wherein
the deciding unit compares the edge intensities of the plurality of images in a partial region including regions detected as the edges by the deriving unit and decides the weights such that a weight of an image other than an image, which has a greatest edge intensity, with respect to the image, which has the greatest edge intensity, in the partial region is smaller than a weight of the image other than the image, which has the greatest edge intensity, with respect to the image, which has the greatest edge intensity, in a region other than the partial region.

13. The image processing apparatus according to claim 12, wherein the deciding unit sets the weight of the image other than the image, which has the greatest edge intensity, in the partial region as 0, and sets the weight of the image other than the image, which has the greatest edge intensity, in the region other than the partial region as a value other than 0.

14. The image processing apparatus according to claim 13, wherein the deciding unit sets, in the region in which the plurality of images are superposed, the weights of the plurality of images in the region other than the partial region to be equal.

15. An image processing method, comprising:
an acquiring step of acquiring a first image which is captured by a first image capturing unit having a first angle of view and a second image which is captured by a second image capturing unit having a second angle of view smaller than the first angle of view, the second image including an image of an object same as that in the first image;

a transforming step of performing positioning and transformation of the first image and the second image such that images of the same object are superposed;

a detecting step of performing processing of edge detection for detecting an edge of each of the images of the object in a region in which the first image and the second image are superposed;

a deciding step of deciding weights at a time of applying weighted composition to the first image and the second image which are subjected to the positioning and the transformation at the transforming step; and a composition step of applying the weighted composition to the first image and the second image which are subjected to the positioning and the transformation by the transforming unit, by using the weights decided at the deciding step, wherein at the deciding step, the weights are decided such that a weight of the first image with respect to the second image in a partial region including a region, which is detected as the edge at the detecting step, is smaller than a weight of the first image with respect to the second image in a region other than the partial region.

16. An image processing method, comprising:

an acquiring step of acquiring a plurality of images obtained by performing image capturing of a same object by using image capturing units each of which has a different focal length;

a transforming step of performing positioning and transformation for the plurality of images such that images of the same object are superposed;

a deriving step of detecting edges of the images of the object and deriving edge intensities of the detected edges;

a deciding step of deciding weights at a time of applying weighted composition to the plurality of images which are subjected to the positioning and the transformation at the transforming step; and a composition step of applying the weighted composition to the plurality of images which are subjected to the positioning and the transformation at the transforming step, by using the weights decided at the deciding step, wherein the deciding step is a step at which the edge intensities of the plurality of images are compared in a partial region including regions detected as the edges at the deriving step and the weights are decided such that a weight of an image other than an image, which has a greatest edge intensity, with respect to the image, which has the greatest edge intensity, in the partial region is smaller than a weight of the image other than the image, which has the greatest edge intensity, with respect to a weight of the image, which has the greatest edge intensity, in a region other than the partial region.

17. A non-transitory computer readable recording medium storing a program for causing a computer to perform:

an acquiring step of acquiring a first image which is captured by a first image capturing unit having a first angle of view and a second image which is captured by a second image capturing unit having a second angle of view smaller than the first angle of view and includes an image of an object same as that in the first image, a transforming step of performing positioning and transformation of the first image and the second image such that images of the same object are superposed, a detecting step of performing processing of edge detection for detecting an edge of each of the images of the object in a region in which the first image and the second image are superposed, a deciding step of deciding weights at a time of applying weighted composition to the first image and the second image which are subjected to the positioning and the transformation at the transforming step, and a composition step of applying the weighted composition to the first image and the second image which are subjected to the positioning and the transformation at the transforming step, by using the weights decided at the deciding step, and wherein at the deciding step, the weights are decided such that a weight of the first image with respect to the second image in a partial region including a region, which is detected as the edge at the detecting step, is smaller than a weight of the first image with respect to the second image in a region other than the partial region.

18. A non-transitory computer readable recording medium storing a program for causing a computer to perform:

an acquiring step of acquiring a plurality of images obtained by performing image capturing of a same object by using image capturing units each of which has a different focal length;

a transforming step of performing positioning and transformation for the plurality of images such that images of the same object are superposed;

a deriving step of detecting edges of the images of the object and derives edge intensities of the detected edges;

a deciding step of deciding weights at a time of applying weighted composition to the plurality of images which are subjected to the positioning and the transformation at the transforming step; and a composition step of applying weighted composition to the plurality of images which are subjected to the positioning and the transformation at the transforming step, by using the weights decided at the deciding step, and wherein the deciding step is a step at which the edge intensities of the plurality of images are compared in a partial region including regions detected as the edges at the deriving step and the weights are decided such that a weight of an image other than an image, which has a greatest edge intensity, with respect to the image, which has the greatest edge intensity, in the partial region is smaller than a weight of the image other than the image, which has the greatest edge intensity, with respect to a weight of the image, which has the greatest edge intensity, in a region other than the partial region.

* * * * *